US 8,948,021 B2

(12) United States Patent
Yang et al.

(10) Patent No.: US 8,948,021 B2
(45) Date of Patent: Feb. 3, 2015

(54) METHODS AND APPARATUS TO MONITOR BORDER GATEWAY PROTOCOL SESSIONS

(75) Inventors: Chen-Yui Yang, Marlboro, NJ (US); Paritosh Bajpay, Edison, NJ (US); Wen-Jui Li, Bridgewater, NJ (US); Peter Wanda, Orlando, FL (US); Ken Yeh, Parsippany, NJ (US); Carolyn V. Bekampis, Wayside, NJ (US)

(73) Assignee: AT&T Intellectual Property I., L.P., Atlanta, GA (US)

( * ) Notice: Subject to any disclaimer, the term of this patent is extended or adjusted under 35 U.S.C. 154(b) by 199 days.

(21) Appl. No.: 13/459,611

(22) Filed: Apr. 30, 2012

(65) Prior Publication Data
US 2012/0213091 A1    Aug. 23, 2012

Related U.S. Application Data

(63) Continuation of application No. 12/258,855, filed on Oct. 27, 2008, now Pat. No. 8,169,921.

(60) Provisional application No. 61/101,424, filed on Sep. 30, 2008.

(51) Int. Cl.
*G01R 31/08* (2006.01)
*H04L 12/703* (2013.01)
*H04L 12/24* (2006.01)
*H04L 12/26* (2006.01)
*H04L 12/715* (2013.01)

(52) U.S. Cl.
CPC ............ *H04L 45/28* (2013.01); *H04L 41/0681* (2013.01); *H04L 43/16* (2013.01); *H04L 45/04* (2013.01)
USPC ........................................ 370/242

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 548–463, 464–497, 498–522, 370/523–520, 521–529
See application file for complete search history.

(56) References Cited

U.S. PATENT DOCUMENTS

| | | |
|---|---|---|
| 6,173,324 B1 | 1/2001 | D'Souza |
| 6,760,777 B1 | 7/2004 | Agarwal et al. |
| 6,820,132 B1 | 11/2004 | Puente et al. |
| 7,035,202 B2 | 4/2006 | Callon |

(Continued)

OTHER PUBLICATIONS

Scott Morris, What's the Difference Between ABR and ASBR?, TCPmag.com, May 1, 2002, 2 pages.

(Continued)

*Primary Examiner* — Jung-Jen Liu
(74) *Attorney, Agent, or Firm* — Hanley, Flight & Zimmerman, LLC

(57) ABSTRACT

Example methods and apparatus to monitor border gateway protocol sessions are disclosed. A disclosed example method includes detecting a failure of a first BGP session, initiating a sustained-down timer and a reset-timer in response to detecting the failure, identifying a sustained-down condition in response to the sustained-down timer exceeding a first time threshold, identifying a flapping condition in response to counting a threshold number of BGP failures and corresponding BGP re-establishments during a second time threshold of the reset-timer, and identifying a continuous flapping condition in response to detecting the flapping condition consecutively for a threshold number of instances.

17 Claims, 9 Drawing Sheets

(56) References Cited

U.S. PATENT DOCUMENTS

| | | | |
|---|---|---|---|
| 7,080,161 | B2 | 7/2006 | Leddy et al. |
| 7,155,535 | B2 | 12/2006 | Agarwal et al. |
| 7,406,030 | B1 | 7/2008 | Rijsman |
| 7,570,580 | B1 | 8/2009 | Bajpay et al. |
| 7,864,706 | B1 | 1/2011 | Zinjuwadia et al. |
| 8,169,921 | B2 | 5/2012 | Yang et al. |
| 2004/0024865 | A1* | 2/2004 | Huang et al. ............ 709/224 |
| 2004/0039840 | A1 | 2/2004 | Dispensa et al. |
| 2004/0221296 | A1* | 11/2004 | Ogielski et al. ............ 719/313 |
| 2005/0018602 | A1 | 1/2005 | Labovitz |
| 2005/0198269 | A1 | 9/2005 | Champagne et al. |
| 2006/0159076 | A1* | 7/2006 | Bless et al. ............ 370/356 |
| 2007/0014231 | A1 | 1/2007 | Sivakumar et al. |
| 2007/0070990 | A1 | 3/2007 | Chong et al. |
| 2007/0091793 | A1 | 4/2007 | Filsfils et al. |
| 2007/0180105 | A1 | 8/2007 | Filsfils et al. |
| 2007/0189177 | A1 | 8/2007 | Zhai |
| 2008/0031239 | A1 | 2/2008 | Kapoor et al. |
| 2008/0089231 | A1 | 4/2008 | Appanna et al. |
| 2008/0089348 | A1 | 4/2008 | Appanna et al. |
| 2008/0130645 | A1* | 6/2008 | Deshpande et al. ............ 370/392 |
| 2009/0034542 | A1 | 2/2009 | He |
| 2009/0046579 | A1 | 2/2009 | Lu et al. |
| 2009/0182896 | A1 | 7/2009 | Patterson et al. |
| 2009/0262660 | A1 | 10/2009 | Watari et al. |
| 2010/0080115 | A1 | 4/2010 | Yang et al. |

OTHER PUBLICATIONS

AVICI Systems, BGP Dampening, Powerfast.net, May 10, 2004, 3 pages.
Kozierok, BGP Error Reporting: Notification Messages, The TCP/IP Guide, tcpipguide.com, Sep. 20, 2005, 4 pages.
Juniper Networks, Inc., BGP Overview, juniper.net, 2007, 1 page.
Cisco Systems, Inc., Troubleshooting Flapping BGP Routes (Recursive Routing Failure), Aug. 10, 2005, 7 pages.
Juniper Networks, Inc., Configuring a Route Reflector (Optional), juniper.net, 2007, 2 pages.
Juniper Networks, Inc., Configuring Damping Parameters (Optional), juniper.net, 2007, 3 pages.
Juniper Networks, Inc., Configuring Point-to-Point Peering Sessions (Required), juniper.net, 2007, 2 pages.
Hewlett-Packard Development Company, L.P., IP Telephony Lifecycle Management, Oct. 2007, 8 pages.
Wang et al., Understanding BGP Session Failures in a Large ISP, May 2007, 9 pages.
Kozierok, TCP/IP Interior Routing Protocols (RIP, OSPF, GGP, HELLO, IGRP, EIGRP), The TCP/IP Guide, tcpipguide.com, Sep. 20, 2005, 3 pages.
Cisco Systems, Inc., BGP Flap Dampening, 2000, 8 pages.
Villamizar et al., BGP Route Flap Damping, Nov. 1998, 32 pages.
Juniper Networks, Inc., Route Reflectors—for Added Hierarchy, 2007, 2 pages.
United States Patent and Trademark Office, Notice of Allowance, issued in connection with U.S. Appl. No. 12/258,855, mailed Dec. 27, 2011, 34 pages.
United States Patent and Trademark Office, Final Office Action, issued in connection with U.S. Appl. No. 12/258,855, mailed Feb. 18, 2011, 47 pages.
United States Patent and Trademark Office, Non-Final Office Action, issued in connection with U.S. Appl. No. 12/258,855, mailed May 25, 2010, 56 pages.

* cited by examiner

METHODS AND APPARATUS TO MONITOR BORDER GATEWAY PROTOCOL SESSIONS

CROSS REFERENCE TO RELATED APPLICATION

This patent is a continuation of and claims priority to U.S. application Ser. No. 12/258,855, now U.S. Pat. No. 8,169,921, filed Oct. 27, 2008, entitled "Methods and Apparatus to Monitor Border Gateway Protocol Sessions," which claims priority to provisional U.S. Application Ser. No. 61/101,424, filed Sep. 30, 2008, where are hereby incorporated herein by reference in their entireties.

FIELD OF THE DISCLOSURE

This disclosure relates generally to autonomous system communication and, more particularly, to methods and apparatus to monitor border gateway protocol sessions.

BACKGROUND

An autonomous system (AS) includes routers typically owned and/or otherwise controlled by an independent organization, such as businesses, government entities, and/or corporations. An AS of a first entity may be communicatively linked with the AS of one or more other entities. However, each organization may exhibit exclusive control over its respective autonomous system(s) (ASes), which allows an administrator of the AS to control the manner in which the AS is operated. The AS may be configured by the administrator to permit network traffic related to the organization while blocking more generalized Internet traffic. In the event that the organization has two or more ASes, each AS must run a common exterior routing protocol even if the internal routing protocol(s) of each AS are different and/or otherwise unique.

A border gateway protocol (BGP) is the common exterior routing protocol that is employed to allow two or more ASes to communicate with each other. The BGP allows one or more separate networks, such as ASes, to select communication routes between hosts. The communication routes are typically stored in routing tables of BGP routers. The routing tables allow the BGP routers of different networks (for example, alternate ASes) to exchange reachability information. Route information is exchanged between the BGP routers and propagated throughout the network(s) that ultimately allow ASes to determine communication paths to each other.

To ensure that BGP routers are available as one or more of the communication routes for a host, the BGP routers establish sessions, provide Keepalive notification messages, and exchange routing update information to identify new routing opportunities and/or to remove routing paths that are no longer functional. When a BGP session established by a BGP router fails, then one or more BGP router neighbors typically purge their routing tables of the information related to the BGP router associated with the failed BGP session. However, BGP router sessions may sometimes fail in an infrequent manner and the session may re-establish a short time after failure. Such intermittent failure may be tolerated by the administrator and/or the organization that employs the administrator (for example, an Internet Service Provider). In other circumstances, the failure and re-establishment of the BGP session may occur with greater frequency, which may be problematic for customers of the administrator.

DETAILED DESCRIPTION

Example methods and apparatus to monitor border gateway protocol sessions are disclosed. A disclosed example method includes detecting a failure of a first border gateway protocol (BGP) session and initiating a session-down timer in response to detecting the failure. The example method also includes generating a sustained-down alarm when a threshold time value of the session-down timer is exceeded before the first BGP session is re-established.

A disclosed example apparatus includes a BGP interface manager to retrieve BGP session data and a trap manager to extract session failure information from the retrieved session data. The example apparatus also includes a BGP interface profile manager to associate a threshold profile with an interface associated with the extracted session failure information and verify whether the session failure information includes a sustained down state.

In the interest of brevity and clarity, throughout the following disclosure, references will be made to the example communication system 100 of FIG. 1, the example communication system 200 of FIG. 2, and/or to BGP sessions. However, the methods and apparatus described herein to monitor BGP sessions are applicable to other types of systems and/or networks constructed using other network technologies, topologies and/or protocols, and/or to other types of communication sessions and/or communication applications.

Figure 1:
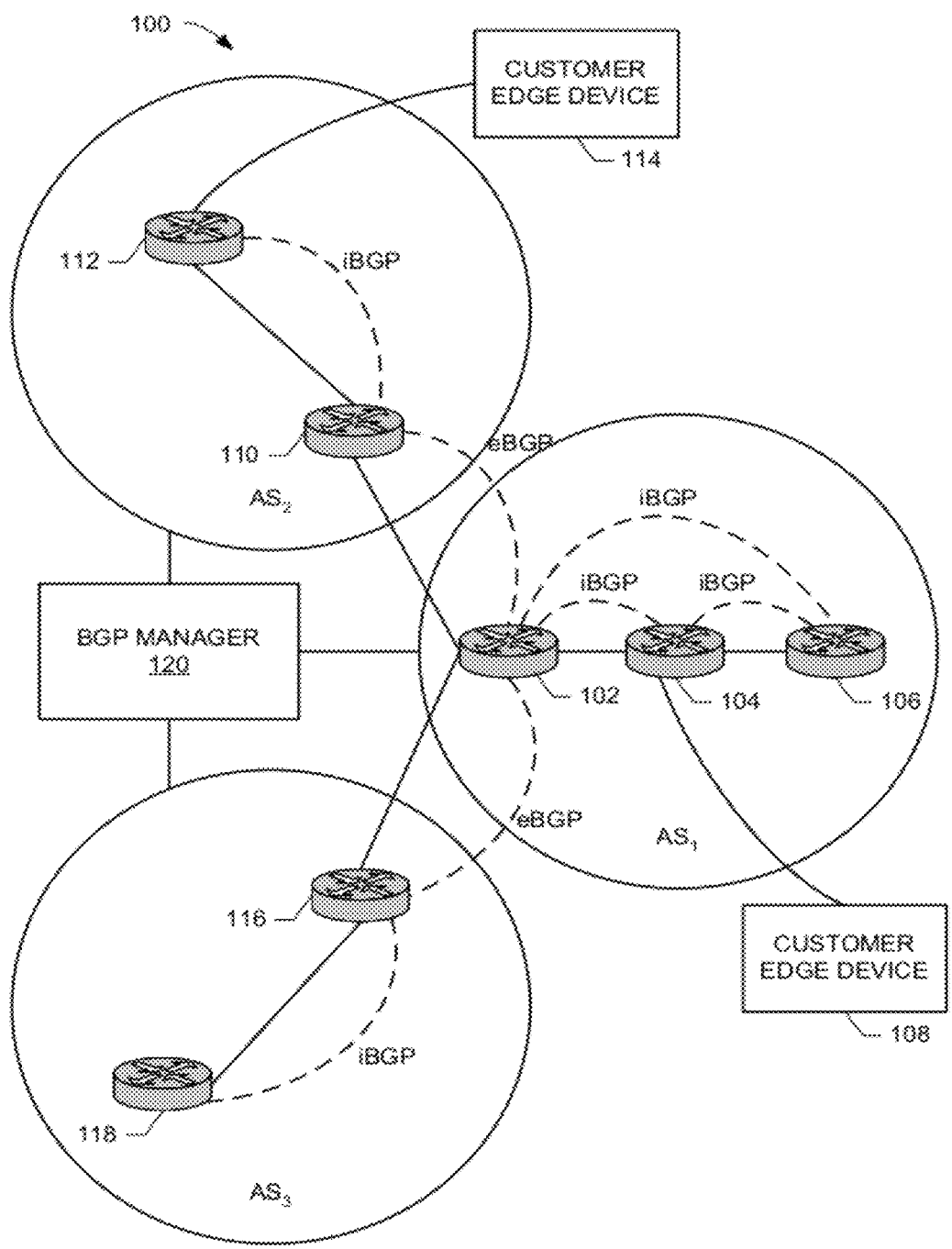
FIG. 1 is a schematic illustration of an example communication system constructed in accordance with the teachings of this disclosure.

FIG. 1 is a schematic illustration of the example communication system 100, which includes any number of autonomous systems (ASes), three of which are shown as a first autonomous system ($AS_1$), a second autonomous system ($AS_2$), and a third autonomous system ($AS_3$). Each autonomous system ($AS_1$, $AS_2$, $AS_3$) may include any number of network interfaces, such as external routers, peering routers, edge routers, route reflectors, landing routers, and/or border routers. ASes may be configured as a multihomed AS, which maintains connection(s) to two or more other ASes. Additionally, ASes may be configured as stub ASes, which connect to only one other AS. A transit AS, on the other hand, is an AS configured to provide one or more communication routes through itself to other networks. In the illustrated example of FIG. 1, $AS_1$ is shown as a multihomed AS, and $AS_2$ and $AS_3$ are stub ASes. Example $AS_1$ of FIG. 1 may function as a transit AS, which is typically employed by Internet Service Providers (ISPs) to facilitate intranetwork connections.

In the illustrated example of FIG. 1, $AS_1$ includes a peer router 102, an edge router (ER) 104, and a route reflector (RR) 106. The edge router 104 is communicatively connected to an example customer edge (CE) device 108, such as a computer, a router, and/or a voice over Internet protocol (VoIP) device. $AS_2$ includes an example autonomous system border router (ASBR) 110, an ER 112. A CE device 114 is communicatively connected to the ER 112. $AS_3$ includes an example ASBR 116 and an ER 118. Each of the autonomous systems $AS_1$, $AS_2$, and/or $AS_3$ may include any number of interfaces (for example, ASBRs, ERs, RRs, etc.) that service any number of CEs and/or additional and/or alternate ASes. To the extent that the illustrated examples of FIG. 1 show a limited number of interfaces, ASes, and/or CEs, such illustrations of FIG. 1 are limited in scope only for purposes of ease of clarity and brevity.

Each of the autonomous systems $AS_1$, $AS_2$, and/or $AS_3$ may execute any number and/or type(s) of interior routing protocol(s) to facilitate routing information exchanges between interfaces of the ASes. Interior routing protocols may include, but are not limited to, the Routing Information Protocol (RIP), Open Shortest Path First (OSPF), and/or manufacturer specific interior routing protocols such as the Interior Gateway Routing Protocol (IGRP) and the Enhanced Interior Gateway Routing Protocol (EIGRP), which are associated with Cisco® products. While each AS maintained by a network administrator may employ one or more unique interior routing protocols and privately keep any details of the AS from neighboring network(s), to allow ASes to communicate with each other and/or utilize neighboring AS resources, a common exterior routing protocol is employed, such as the BGP.

BGP allows individual and/or separate networks and/or ASes to determine network routes for the propagation of network traffic. BGP is a path-vector protocol that employs path attributes to describe the characteristics of one or more network routes available for each interface. A BGP peer is a type of router that has been manually configured to exchange routing information via a TCP connection, but does not employ discovery techniques. A BGP client includes a router that is configured to pass and/or receive its routing information to/from other routers (for example, to other BGP peers, other BGP clients, RRs, etc.) during a periodic and/or on-demand update process.

Generally speaking, a BGP RR serves as a focal point for internal BGP (iBGP) sessions and provides route information to the BGP client(s). In some examples, an iBGP peer may be configured as a RR to pass learned internal BGP routes to other interfaces within the AS. As used herein, the term interface refers to any network device such as, but not limited to, a network router. In the illustrated example of FIG. 1, the peer router 102, ER 104, and the RR 106 maintain iBGP sessions with each other in $AS_1$, as shown by the dashed lines and corresponding nomenclature. Similarly, the example ASBR 110 and ER 112 of $AS_2$ maintain an iBGP session with each other, and the example ASBR 116 and ER 118 maintain an iBGP session with each other in $AS_3$. On the other hand, BGP sessions that operate between separate networks, such as separate ASes, employ external BGP (eBGP) sessions. Interfaces that reside on a boundary of an AS are typically referred to as border routers and/or ERs. Such interfaces are configured to exchange routing information between different network(s). In the illustrated example of FIG. 1, the peer router 102 maintains eBGP sessions (as shown by dashed-lines) with the ASBR 110 of $AS_2$ and the ASBR 116 of $AS_3$.

In the event that one or more BGP sessions of an interface fails, such failure may result in Internet, intranet, virtual private network (VPN), and or ISP access failures. BGP session failures may also generally cause routing instability within one or more networks that have particularly negative effects on service providers that support customers having a need for performance and timeliness of data delivery. Customers that require performance include VoIP customers, gaming customers, and/or corporate customers that require high-bandwidth connectivity to the Internet.

Causes for BGP session failures may include, but are not limited to, physical layer failures, configuration changes, congestion, and/or router software bugs. Some network routers employ session traps to identify the time and date when a BGP session fails, as well as the Internet Protocol (IP) address associated with the failed session. However, because BGP sessions may fail for brief periods of time and/or BGP sessions may be infrequent, a session trap indicative of a failure is not necessarily cause for the network administrator to be concerned. Furthermore, in some instances, frequent BGP trap notification messages that indicate a session has gone down and/or has been reestablished become cumbersome and computationally intensive for processing. Each trap that the router (also more generally referred to as an "interface" herein) must process consumes processing resources that may negatively affect other functionality of the router. As such, network administrators may assume that trap alarms in an AS are in response to inconsequential and/or brief interruptions of the many BGP session(s) processed by a router and disable the traps out a concern for negative performance consequences associated with processing each alarm.

At least one problem associated with network administrators disabling BGP session traps of the network interface(s) is that the administrators do not have sufficient information about each session failure to ascertain whether it is an infrequent anomaly, a sustained session failure, a repeated pattern of failed and reestablished sessions, and/or a session failure that causes performance degradation of neighboring network interfaces and/or neighboring ASes. Additionally, the network administrators may not appreciate that some BGP sessions are more important than others based on the type of customers/clients supported by particular network interface equipment. For example, corporate customers typically require high-bandwidth networks with low latency and minimal interruptions, while home users may not have the same performance expectations. As a result, the administrator may not appreciate that BGP session failures are occurring on interfaces that cannot tolerate down time, and, thus, may be slow to react by issuing rapid service tickets for repair and/or replacement of suspicious interfaces.

To address BGP session failures in a more timely, efficient, and informative manner, the example BGP Manager 120 monitors BGP sessions for one or more networks (for example, one or more ASes). As such, the methods and apparatus described herein allow network interfaces to turn off internal BGP session trap(s) that would otherwise consume processing resources of the interface(s). Additionally, the example BGP Manager 120 correlates BGP session failures with consequential effects at alternate network interfaces and/ or alternate network sessions. In other words, the example BGP Manager 120 may, in part, identify a failed BGP session and correlate subsequent negative effects of the failed session with a separate BGP session on the same and/or different interfaces (for example, one or more sessions facilitated by alternate routers). For example, a failed BGP session at a first interface may be the cause for a corresponding BGP session failure at a second interface that was paired with the first interface. On the other hand, the failed BGP session at the first interface may have been caused by the BGP session failure at the second interface.

In operation, the example BGP Manager 120 of FIG. 1 monitors interfaces associated with the autonomous systems $AS_1$, $AS_2$, and $AS_3$, identifies instances of BGP session failures, and compares each session failure against at least one time and/or event threshold to determine whether an alarm is justified. Corresponding alarms generated by the example BGP Manager 120 categorize the type of BGP session failure, which allow the network administrator to take appropriate action(s) (for example, repair router, replace router, reconfigure routing table, etc.) in a more timely manner and, preferably, prior to significant customer disruption. BGP session failure categorization includes, but is not limited to, a Sustained Down condition, a BGP Flapping condition, and/or a Continuous Flapping condition. As described above, the example communication system 100 may include greater or fewer ASes, networks, and/or sub-networks than are shown in FIG. 1. Accordingly, the example methods and apparatus described herein, including the example BGP Manager 120 may operate with any number of alternate and/or additional network configurations and/or communication system(s) than those shown in FIG. 1.

Figure 2:
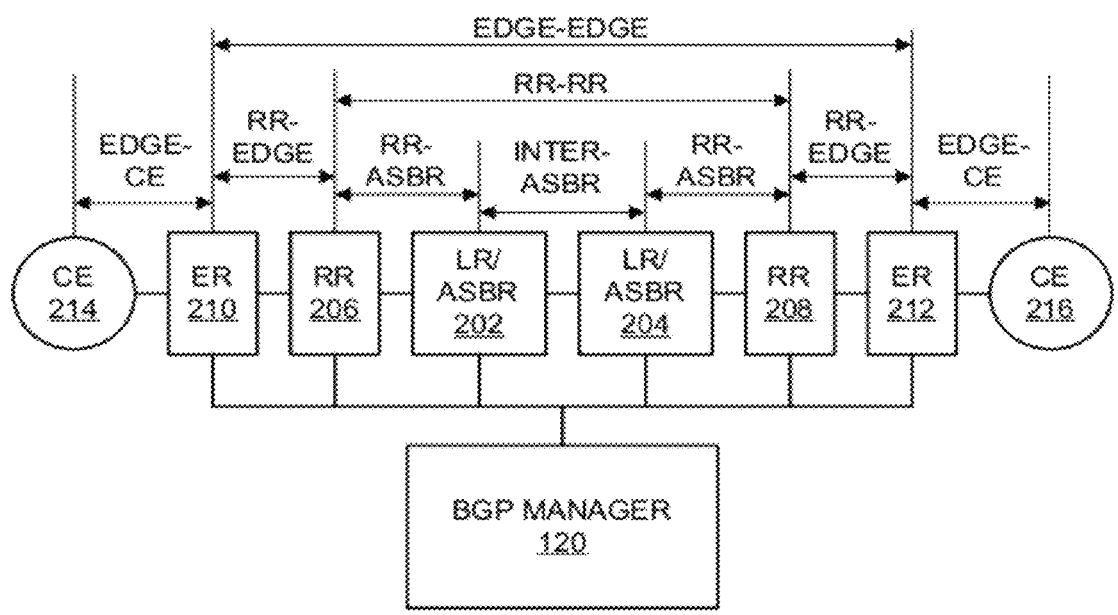
FIG. 2 is a schematic illustration of example interfaces employed within the example communication system of FIG. 1.

In the illustrated example of FIG. 2, the BGP manager 120 is configured to monitor one or more pairs of network interfaces to detect BGP session failures in a network 200. Additionally, the example BGP manager 120 is configured to manage BGP session alarms that segregate problematic session failures capable of service disruption from innocuous session failures that may be too infrequent and/or intermittent to justify generating a trouble ticket. In some examples, the network administrator may be particularly interested in specific individual network interfaces, interface pairs that service particularly important and/or demanding customers, and/or specific groups of network interfaces. As such, the network administrator may exert control over what conditions justify one or more alarms by, for example, setting threshold BGP session failure count value(s) and/or setting threshold BGP session failure duration(s).

For example, to verify one or more major communication links for a large corporation, the network administrator may be interested in monitoring BGP session health (for example, session stability, frequency of session failures, duration of session failures, etc.) between a first ASBR 202 and a second ASBR 204. The example network 200 of FIG. 2 also includes a first RR 206, a second RR 208, a first ER 210, a second ER 212, a first CE 214, and a second CE 216. As described above, example CEs may include any consumer equipment configured to connect and/or operate with a network, such as home routers, VoIP routers, and/or workstations. Although the example BGP manager 120 of FIG. 2 shows potential BGP session pairs between the first ASBR 202 and the second ASBR 204, session pairs between the first RR 206 and the second RR 208, session pairs between the first ER 210 and the second ER 212, and session pairs between the first CE 214 and the second CE 216, the example BGP manager 120 is not limited to such session pairs. Rather, the example BGP manager 120 may be configured to monitor BGP session information of any one interface of the example network 200, and/or any combination of network interfaces of the network 200.

In addition to the example BGP manager 120 monitoring specific pairs and/or groups of network interfaces, the BGP manager 120 also monitors each interface individually to identify when a session has failed, and identifies which corresponding interface(s) may be affected by the session failure(s), as described in further detail below. For example, upon detecting that the first RR 206 has experienced a failed BGP session, the BGP manager 120 determines which other interface(s) are also affected by the BGP session failure of the first RR 206.

Figure 3:
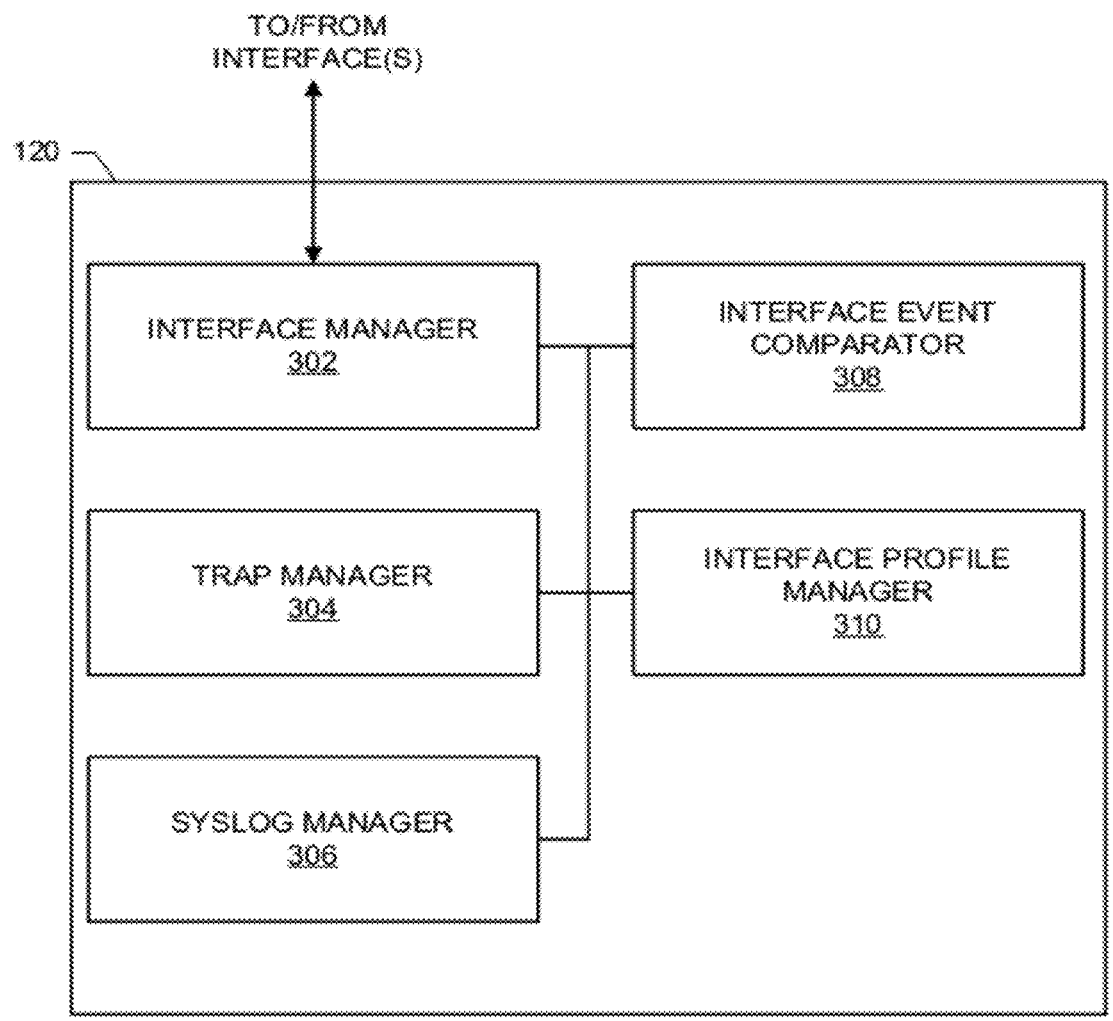
FIG. 3 is a schematic illustration of an example border gateway protocol manager shown in FIGS. 1 and 2.

FIG. 3 is a detailed schematic illustration of the example BGP manager 120 shown in FIGS. 1 and 2. The example BGP manager 120 includes an interface manager 302, a trap manager 304, a system log (syslog) manager 306, an interface event comparator 308, and an interface profile manager 310. In operation, the example interface manager 302 maintains a list of the interfaces associated with one or more networks, such as the interfaces contained within $AS_1$, $AS_2$, and/or $AS_3$ shown in FIG. 1. Each interface, such as a router, has a unique identifier on the network, such as a unique IP address and/or machine address code. To establish communication with each interface, the example interface manager 302 of the BGP manager 120 provides authentication credentials to the interface (for example, to a router), which may be stored in a list, a database, and/or a memory location, such as the example random access memory P115 and/or the example read only memory P120 of FIG. 9. Additionally, the example interface manager may identify the type of interface and/or brand of interface and select appropriate query commands from a stored list, database, and/or memory location, such as the example random access memory P115 and/or the example read only memory P120 of FIG. 9. For example, routers manufactured by Cisco® may have different query commands than routers sold by other manufacturers, such as routers manufactured by Juniper®.

The example interface manager 302 operates on a periodic, aperiodic, scheduled, manual, and/or event-based schedule to invoke one or more queries for the interface(s) of the network. Such queries facilitate extraction of status data associated with the interface(s). Query commands may include, but are not limited to, show IP commands, trap query list commands, syslog commands, and/or any other commands to reveal interface events. Additionally or alternatively, the example BGP manager 120 may be configured to monitor BGP notification messages that occur pursuant to the border gateway protocol. For example, BGP includes notification message error codes and error subcodes. Error codes include, but are not limited to, message header errors, open message errors that may relate to authentication failures, update message errors, and/or hold timer expiration errors that may indicate failures related to Keepalive messages. Error subcodes include, but are not limited to bad peer AS errors, authentication failures, and/or unacceptable hold time errors. Information returned from such query commands and/or otherwise detected that are related to BGP session notification(s) are saved to a memory, which is parsed and managed by the example trap manager 304, as described in further detail below. However, information returned from such query commands related to a system log of each interface is saved to a memory, which is parsed and managed by the syslog manager 306, which is described in further detail below.

Each interface queried by the example interface manager 302 of FIG. 3 includes an associated profile managed by the interface profile manager 310 to identify a threshold time at which a sustained session failure duration is deemed a Sustained Down condition. Additionally, the interface profile manager 310 also identifies a threshold frequency of BGP session failures combined with corresponding BGP session reconnections that, if reached within a flapping threshold time period, will be deemed a BGP Flapping condition. To determine whether a BGP Flapping condition is also deemed a Continuous Flapping condition, the example interface profile manager 310 also includes a continuous threshold time to identify whether the BGP Flapping condition persists. A persistent BGP flapping condition may be indicative of a faulty interface within the network. The sustained, flapping, and continuous threshold times associated with each network interface are stored in the example interface profile manager 310. Additionally, the interface profile manager 310 configures and executes corresponding timers for the time threshold (s) associated with each interface by, for example, creating corresponding memory registers in the example processor of FIG. 9 and incrementing the values in such memories in response to a clock. As described above, at least one reason to apply different threshold timers and/or threshold counts to different interfaces is due to particular customer demands and/or expectations. For example, customers involved in bandwidth intensive financial businesses are less able to tolerate network disruption than suburban household customers that use networks for casual e-mail and web browsing activities.

As described above, the BGP is a protocol with many different types of messages, but only some of those messages are relevant for purposes of determining a Sustained Down condition, a BGP Flapping condition, and/or a Continuous Flapping condition. Thus, the BGP session messages received by the example trap manager 304 are filtered to maintain only the BGP session information indicative of session failures (session-down conditions) and/or session reestablishment (session-up conditions), hereinafter referred to as session-down and session-up, respectively. The example trap manager 304 extracts a date and time-stamp related to a BGP notification message, which is indicative of a failed BGP session (session-down). Additionally, the example trap manager 304 extracts a date and time-stamp related to a BGP Keepalive message, which indicates a successful Open message has established a working BGP session (session-up).

In the illustrated example of FIG. 3, the interface event comparator 308 compares the filtered BGP session messages in the trap manager 304 against one or more thresholds associated with the interface related to the BGP session activity. Comparisons may occur on a periodic, aperiodic, scheduled, and/or manually invoked basis. For example, the interface event comparator identifies the time at which the BGP session first went down (session-down) and compares that time against the time at which the BGP session went back up (session-up). A session-flap is defined as a session-down followed by a session-up, but a Sustained Down condition doesn't occur unless a corresponding session-up is not detected. If the example interface event comparator 308 detects that no corresponding session-up follows the session-down within a first threshold period of time (for example, a sustained-down threshold time), then the session is identified as a Sustained Down condition, and a corresponding trouble-ticket and/or alarm may be issued. On the other hand, if the example interface event comparator detects that a threshold number of session-flaps occurs within a second threshold period of time (for example, a BGP flapping threshold time), then the session is identified as indicative of a BGP Flapping condition.

An occurrence of a single BGP Flapping condition may not be considered problematic for certain interfaces, as defined by one or more profiles stored in the interface profile manager 310. For example, an occasional and/or intermittent BGP Flapping condition occurring on a first interface may be caused by the BGP protocol itself, a second interface having one or more BGP sessions with the first interface that momentarily loses power, and/or the first interface associated with the BGP session momentarily losing power. Additionally, if the BGP interface is not deemed to be associated with particularly bandwidth-sensitive customers (for example, the BGP interface is associated with home users), then an occasional and/or intermittent BGP Flapping condition may be tolerated by the network administrator, and no trouble-ticket is needed. On the other hand, if the interface associated with the BGP Flapping condition is associated with bandwidth-sensitive customers (for example, business users, financial traders, etc.), then the profile associated with that interface may dictate a trouble-ticket be issued in the event of the BGP Flapping condition.

Continuous Flapping exists when a threshold number of individual BGP Flapping conditions occur within a third threshold period of time (that is, repeating BGP Flapping conditions). Such repeating BGP Flapping conditions are indicative of interface problems that justify issuing a trouble-ticket for further investigation, repair, and/or replacement.

Figure 4A:
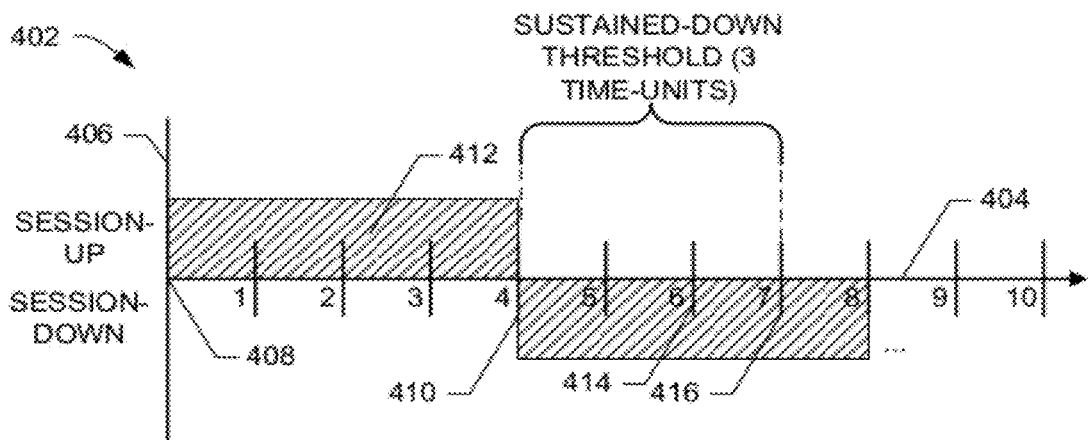
FIGS. 4A, 4B, and 4C are example BGP session timing graphs indicative of Sustained-Down, BGP Flapping, and Continuous Flapping conditions.
Figure 4B:
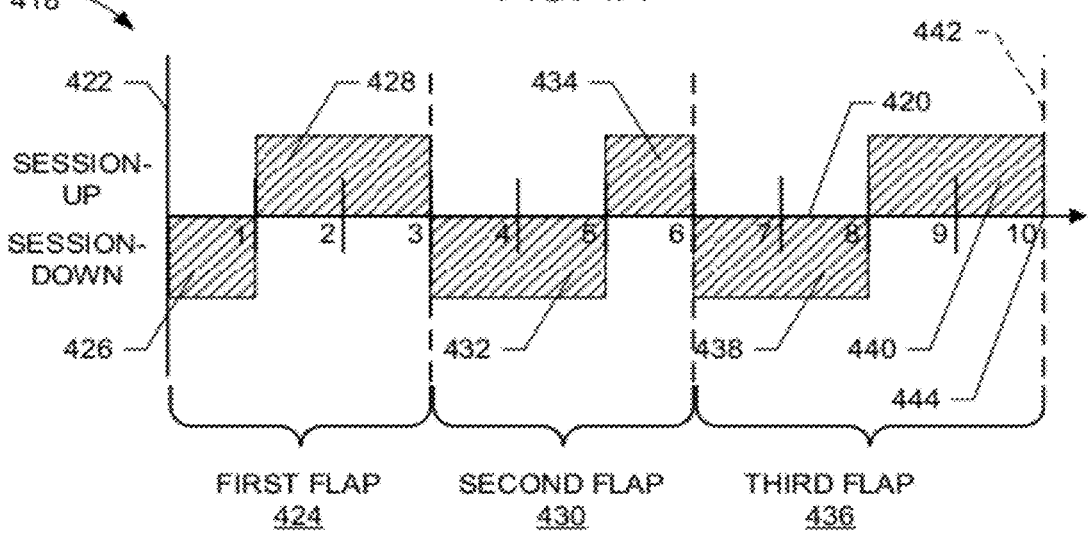
Figure 4C:
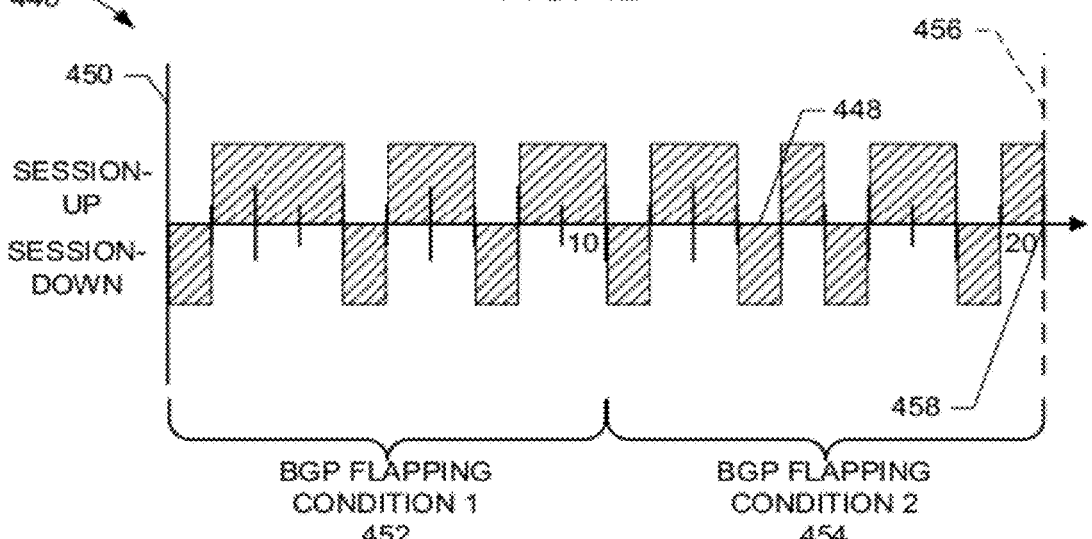

FIGS. 4A-4C illustrate timing graphs indicative of example instances of a Sustained Down condition, a BGP Flapping condition, and a Continuous Flapping condition, respectively. FIG. 4A illustrates BGP session activity timing graph 402 for an example session on an example interface, such as a session between an edge router and a route reflector within an AS. The timing graph 402 includes a horizontal-axis 404 of time units (for example, seconds, minutes, hours, days) and a vertical-axis 406 indicative of whether the BGP session is up (session-up) or down (session-down). A normally operating BGP session is shown in example FIG. 4A as occurring between time unit zero 408 and time unit four 410, as indicated by a session-up region 412. However, at time unit four 410, the example session goes down (session-down), at which time the example interface manager 302 detects and/or otherwise extracts such session information and provides it to the example trap manager 304. The example trap manager 304 associates the BGP session failure with a corresponding time stamp, which, in the illustrated example of FIG. 4A, is time unit four 410. Additionally, the example interface profile manager 310 identifies that the session is associated with a specific interface, and based on the interface profile associated with the identified interface, initiates a corresponding threshold timer.

The interface manager 302 may continue to receive or retrieve BGP session status information for each time unit as a status-check. For example, the interface manager 302 may determine that at time unit six 414 the session is still in a session-down state. If the profile for the identified interface associates a Sustained Down condition with a session-down duration of three time periods, then at time unit six 414 the interface event comparator 308 does not label the session as experiencing a Sustained Down condition because the session-down duration is only two time periods. However, if the interface manager 302 status-check occurs at time unit seven 416, then the interface event comparator 308 calculates that three time units have expired, which matches the Sustained Down profile threshold associated with the identified interface. As such, the example BGP manager labels the session and/or the interface associated with the session (for example, a route reflector, an edge router, etc.) as experiencing a Sustained Down condition.

Similar to FIG. 4A, FIG. 4B also illustrates a BGP session activity timing graph 418 for the example session on the identified interface. The timing graph 418 includes a horizontal-axis 420 of time units (for example, seconds, minutes, hours, days) and a vertical-axis 422 indicative of whether the BGP session is up (session-up) or down (session-down). In the illustrated example of FIG. 4B, a first session flap 424 is identified as a first occurrence of a session-down 426 followed by a session-up 428. A second session-flap 430 is shown in FIG. 4B as a second occurrence of a session-down 432 followed by a session-up 434, and a third session-flap 436 is shown as a third occurrence of a session-down 438 followed by a session-up 440. As described above, a BGP Flapping condition is defined as a threshold number of individual flapping occurrences (for example, the first session-flap 424, the second session-flap 430, and the third session-flap 436) occurring within a threshold period of time. An example BGP Flapping threshold time 442 is shown in FIG. 4B as a dashed vertical line at time-unit ten 444 as measured from, for example, the start time of the first flap 424. In the event that the profile associated with the identified interface defines a BGP Flapping condition as three or more individual session-flaps within ten time-units of the start of the first flap 424, then the example interface event comparator 308 will label the identified interface as experiencing BGP Flapping and issue an alarm and/or trouble-ticket indicating the same.

Similar to FIGS. 4A and 4B, FIG. 4C also illustrates a BGP session activity timing graph 446 for the example session on example identified interface. The timing graph 446 includes a horizontal-axis 448 of time units (for example, seconds, minutes, hours, days) and a vertical-axis 450 indicative of whether the BGP session is up (session-up) or down (session-down). In the illustrated example of FIG. 4C, a first BGP Flapping condition 452 and a second BGP Flapping condition 454 are shown to occur within a Continuous Flapping threshold 456, occurring between time zero at the vertical axis 450 and a dashed vertical line 458 at time-unit twenty. A Continuous Flapping condition is defined as individual BGP Flapping conditions occurring within a threshold period of time. In the event that the profile associated with the identified interface defines a Continuous Flapping condition as BGP Flapping conditions occurring within twenty time units, then because the time period from the vertical axis 450 to the dashed line 458 is twenty time units, the example interface event comparator 308 will label the identified interface as experiencing Continuous Flapping and issue an alarm and/or a trouble-ticket indicating the same.

To determine a correlation between a BGP session failure and an interface failure, the example syslog manager 306 parses relevant log information from each interface and/or the interface event comparator 308 looks for other BGP session failures occurring at substantially the same time. When a common interface is found to exhibit BGP session failures, then that common interface (such as a router) may be identified as a problematic/suspect interface suitable for repair/replacement. Depending on the manufacturer and/or model of each interface, available system log information may vary. BGP session failures that are caused by interface hardware failures are the type of failure over which a network administrator has direct control. For example, interface power outages may explain why BGP session failures occur, thereby providing the system administrator with added information during a troubleshooting process. In the event that an interface system log contains status information related to a circuit power-up date/time stamp, the network administrator may derive an approximate time at which the circuit actually failed. If the time of circuit power failure coincides with weather-related activity, then such corresponding BGP session failures that are caused by interface circuit power-down instances may not give rise to a need to replace interface hardware. However, absent explainable reasons for interface power outages, interface circuit power cycles may be indicative of failing interface hardware and/or network power supply infrastructure, which may warrant an alarm and/or trouble-ticket.

In operation, the example syslog manager 306 receives log information from one or more queries performed by the interface manager 302, as described above. In the event of a BGP session failure, the syslog manager 306 determines whether the interface associated with the BGP session failure has one or more log entries indicative of a power-cycle, a hardware alarm, and/or a planned shut-down line entry. For example, some interface hardware adds a system log entry prior to a planned circuit power-down condition, such as a planned power-down due to over temperature conditions, which may be indicative of an air conditioning system failure at a network sub-station. System log entries by interface hardware may also include, but are not limited to, date/time stamps when a power-up occurs. As such, the example syslog manager 306 associates a BGP session-down date/time stamp with one or more log entries of the interface associated with the failed BGP session. If the syslog manager 306 identifies a power-down and/or power-up log entry at or near the date/time stamp of the BGP session failure, then the session failure cause may be identified as relating to interface hardware malfunction(s).

On the other hand, because a BGP session failure may be caused by neighboring interface hardware failures, if the interface associated with the failed BGP session does not indicate corresponding entries indicative of circuit bounces, then the cause may be due to a neighboring interface. Generally speaking, a circuit bounce is an unplanned power-cycle of the interface, which may be caused by power supply failure(s), interface circuitry failure(s), thermal management issue(s), and/or inclement weather conditions. In that case, the example syslog manager 306 requests that the interface manager 302 perform one or more queries of neighbor interface system logs, if any. If the syslog manager 306 identifies a neighbor interface having a date/time stamp indicative of a circuit bounce at or near the time stamp associated with the BGP session failure, then that neighbor interface may be added as a candidate for repair and/or replacement.

While example communication systems 100 and 200 have been illustrated in FIGS. 1 and 2, one or more of the interfaces, data structures, elements, processes and/or devices illustrated in FIGS. 1 and 2 may be combined, divided, re-arranged, omitted, eliminated and/or implemented in any other way. Further, the example BGP manager 120, the example interface manager 302, the example trap manager 304, the example syslog manager 306, the example interface event comparator 308, and/or the example interface profile manager 310 of FIGS. 1, 2, and 3 may be implemented by hardware, software, firmware and/or any combination of hardware, software and/or firmware. Thus, for example, any or the example BGP manager 120, the example interface manager 302, the example trap manager 304, the example syslog manager 306, the example interface event comparator 308, and/or the example interface profile manager 310 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example BGP manager 120, the example interface manager 302, the example trap manager 304, the example syslog manager 306, the example interface event comparator 308, and/or the example interface profile manager 310 are hereby expressly defined to include a tangible medium such as a memory, a digital versatile disc (DVD), a compact disc (CD), etc. storing the firmware and/or software. Further still, a communication system may include interfaces, data structures, elements, processes and/or devices instead of, or in addition to, those illustrated in FIGS. 1-3 and/or may include more than one of any or all of the illustrated interfaces, data structures, elements, processes and/or devices.

FIGS. 5-8 illustrate example machine-accessible instructions that may be executed to implement the example BGP manager 120 of FIGS. 1-3. The example machine-accessible instructions of FIGS. 5-8 may be carried out by a processor, a controller and/or any other suitable processing device. For example, the example machine-accessible instructions of FIGS. 5-8 may be embodied in coded instructions stored on any tangible computer-readable medium such as a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-readable instructions or data structures, and which can be accessed by a processor, a general-purpose or special-purpose computer, or other machine with a processor (for example, the example processor platform P100 discussed below in connection with FIG. 9). Combinations of the above are also included within the scope of computer-readable media. Machine-readable instructions comprise, for example, instructions and/or data that cause a processor, a general-purpose computer, special-purpose computer, or a special-purpose processing machine to implement one or more particular processes. Alternatively, some or all of the example machine-accessible instructions of FIGS. 5-8 may be implemented using any combination(s) of ASIC(s), PLD(s), FPLD(s), discrete logic, hardware, firmware, etc. Also, some or all of the example machine-accessible instructions of FIGS. 5-8 may instead be implemented manually or as any combination of any of the foregoing techniques, for example, any combination of firmware, software, discrete logic and/or hardware. Further, many other methods of implementing the example operations of FIGS. 5-8 may be employed. For example, the order of execution of the blocks may be changed, and/or one or more of the blocks described may be changed, eliminated, sub-divided, or combined. Additionally, any or all of the example machine-accessible instructions of FIGS. 5-8 may be carried out sequentially and/or carried out in parallel by, for example, separate processing threads, processors, devices, discrete logic, circuits, etc.

Figure 5:
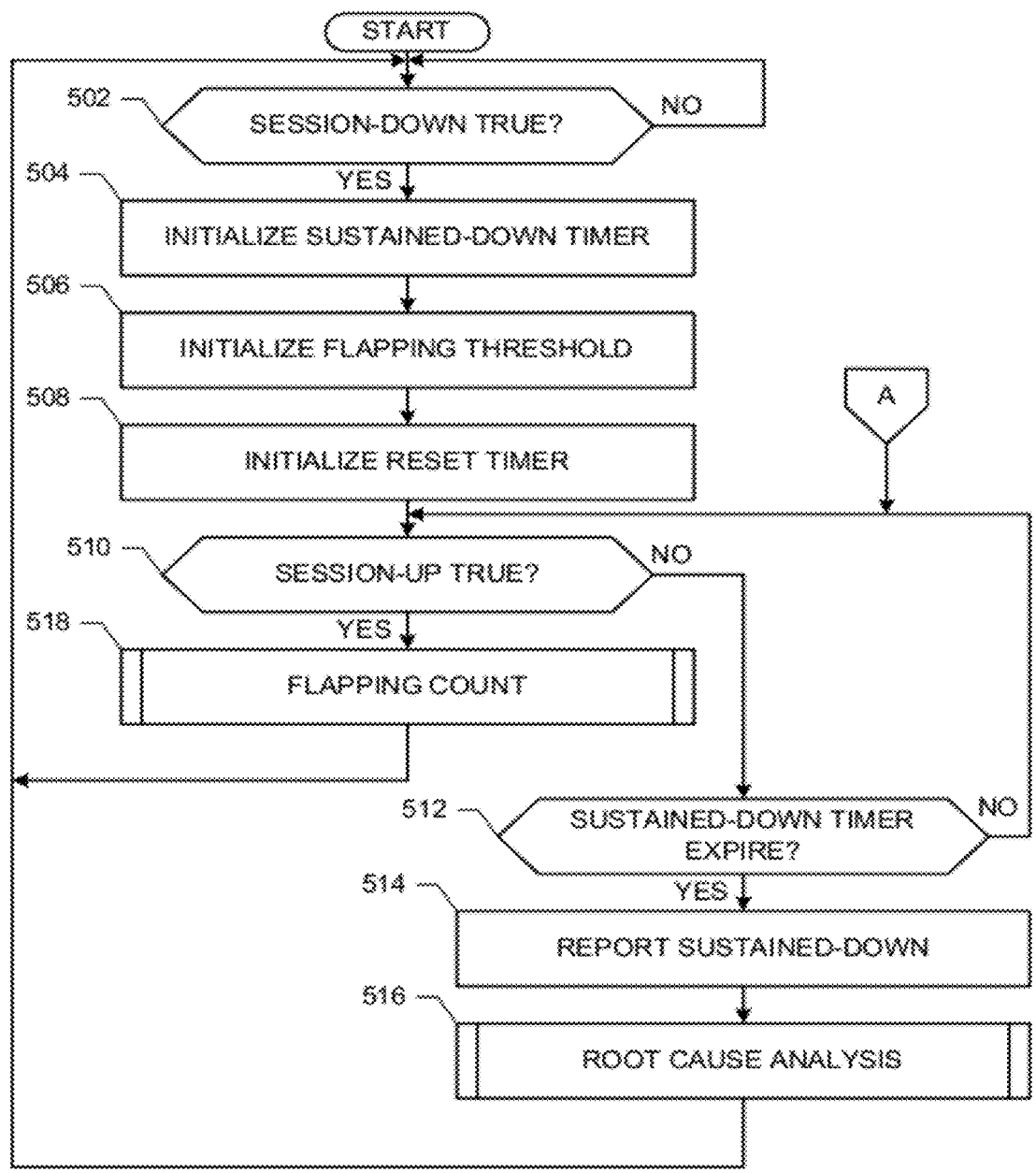
FIGS. 5-8 are flowcharts representative of example machine-accessible instructions that may be executed by, for example, the example border gateway protocol manager shown in FIGS. 1-3.

The example machine-accessible instructions of FIG. 5 begin with the example interface manager 302 collecting BGP session data on a periodic, aperiodic, scheduled, and/or manual basis to determine whether a session-down condition exists (block 502). More specifically, the example interface manager 302 provides collected BGP session data by monitoring border gateway protocol traffic and/or receives BGP session information in response to one or more queries of one or more interface device(s). The example interface manager 302 passes such collected session data to the example trap manager 304. The example trap manager 304 parses the received data to retain only such session information that is indicative of the BGP session state, such as the interface identifier (for example, a unique router identifier), a network identifier (for example, $AS_1$, $AS_2$, $AS_3$, etc.), whether the session is up (session-up), the session is down (session-down), and/or whether the session is negotiating with one or more other interfaces (for example, BGP Open messages). If the example trap manager 304 does not detect that a session-down condition exists (block 502), then the example machine-accessible instructions of FIG. 5 continue to monitor other sessions at the same and/or neighboring interfaces (for example, one or more other sessions of the router and/or neighboring routers) (block 502).

In the event that the example trap manager 304 identifies that a BGP session is down (session-down) (block 502), the trap manager 304 passes the interface identifier to the example interface profile manager 310 to initialize a corresponding sustained-down timer (block 504), a flapping-count threshold (block 506), and a reset-timer (block 508). As described above, different time thresholds and/or count thresholds may be associated with specific interfaces based on, for example, the types of customers that the interfaces support. For customers requiring a relatively high degree of network stability, speed, and/or bandwidth, timers and session failure count-thresholds may be set accordingly to trigger alarms before conditions worsen that attract negative customer attention. On the other hand, customers without such relatively high demands and/or network performance expectations may be associated with interfaces having timers and session failure count-thresholds set with more forgiving limits.

Generally speaking, the sustained-down timer is set to a duration that, if expired before a session-up condition is true, identifies the session as associated with a Sustained Down condition. The flapping-count threshold is an integer value that, if exceeded within the reset-timer duration, identifies the session as associated with a BGP Flapping condition. In other words, if the flapping-count threshold is not exceeded and the reset-timer expires, any flapping that may have occurred is ignored as noise and the analysis resets. If the example trap manager 304 does not detect that a session-up condition is true for the BGP session under analysis (block 510), the example interface profile manager 310 determines whether the sustained-down timer has expired (block 512). If not, then the example BGP manager 120 continues to monitor the BGP session under analysis and the example machine-accessible instructions of FIG. 5 advance to block 510. On the other hand, if the example trap manager 304 does not detect that a session-up condition is true for the BGP session under analysis (block 510) and the sustained-down timer has expired (block 512), then the example BGP manager identifies the session under analysis as associated with a Sustained Down condition (block 514).

BGP neighbor interfaces and/or other BGP sessions may be adversely affected by BGP session failures at the interface under analysis. To understand the root-cause for the Sustained Down condition and/or the effects it may have on other BGP sessions and/or neighboring interfaces, the example interface event comparator 308 analyses BGP session information collected by the interface manager 302 for session and/or interface failures that may share a date/time stamp at or around the same time as the recently identified Sustained Down condition (block 516).

Figure 6:
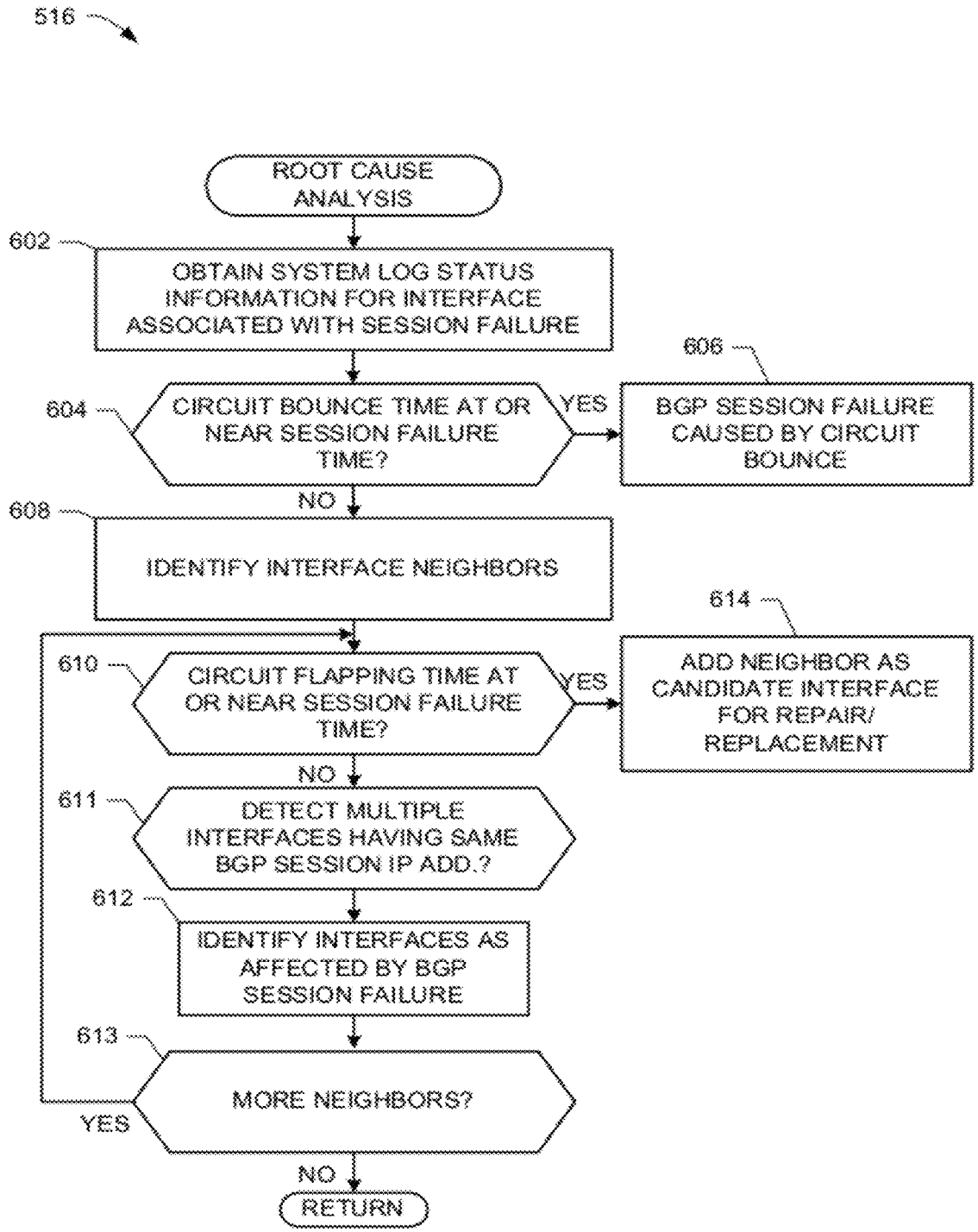

Turning briefly to FIG. 6, example machine-accessible instructions are shown to evaluate a root cause for the BGP session failure (block 516). At the request of the syslog manager 306, the interface manager 302 obtains available system log information from the interface associated with the BGP session identified as failing (block 602). As described above, the example syslog manager 306 may keep a list of specific log query commands for each of the interfaces based on, for example, the interface manufacturer (for example, Cisco®, Juniper®, etc.) and/or the interface model. The example syslog manager 306 parses any returned log data to retain that data which is associated with interface circuit failures and/or power-state changes (block 604). The interface event comparator 308 compares the date/time stamps associated with the returned log data related to power-state changes with the date/time stamps associated with the BGP session failure (block 604). If a circuit bounce time in the returned log is at or near the time at which the BGP session failure occurred, then the example BGP manager attributes the BGP session failure to the circuit bounce of the interface (block 606).

On the other hand, if the interface associated with the BGP session failure does not show evidence of a circuit bounce, as determined by the interface event comparator 308 reviewing interface system log information (block 604), then the example syslog manager 306 identifies interface neighbors by, for example, a neighboring IP address of the interface neighbor(s) to determine whether one or more circuit bounce conditions of one or more interface neighbors is the root cause for the BGP session failure (block 608). The example syslog manager 306 may query a BGP table of an interface to identify neighbor interfaces. Additionally, the syslog manger 306 may select one or more of the neighbor interfaces from the BGP table based on, for example, the most active interfaces (for example, greatest network traffic). The example interface event comparator 308 compares the date/time stamps associated with returned log data related to power-state changes of a neighbor interface and, if that neighbor interface does not include any power-state change information (block 610), the example interface event comparator 308 determines if other interfaces are affected by the BGP session failure (block 611). The failed BGP session includes an associated IP address as data related to border gateway protocol messaging. When such IP address data is detected by the BGP manager 120 at two or more interfaces (block 611), the interface event comparator 308 identifies each interface as affected by the BGP session failure (block 612). Additionally, the example interface event comparator 308 determines if there are additional interface neighbors to evaluate as potential candidates (block 613). If, however, one or more of the neighbor interfaces do show evidence of a circuit power state change (block 610), then the syslog manager 306 identifies such neighbor interfaces as potential root causes for the BGP session failure (block 614), thereby allowing an alarm and/or trouble-ticket to be issued (block 614).

Returning to FIG. 5, in the event that the sustained-down timer has not expired (block 512) and the BGP session status returns to a state of session-up (block 510), then the example BGP manager 120 counts the frequency of flapping occurrences to determine whether a BGP Flapping condition or a Continuous Flapping condition is true (block 518). As described above, a BGP Flapping condition is evidenced by a threshold number of individual flapping occurrences within a threshold period of time. Further, a Continuous Flapping condition is evidenced by a threshold number of individual BGP Flapping conditions occurring within a threshold period of time.

Figure 7:
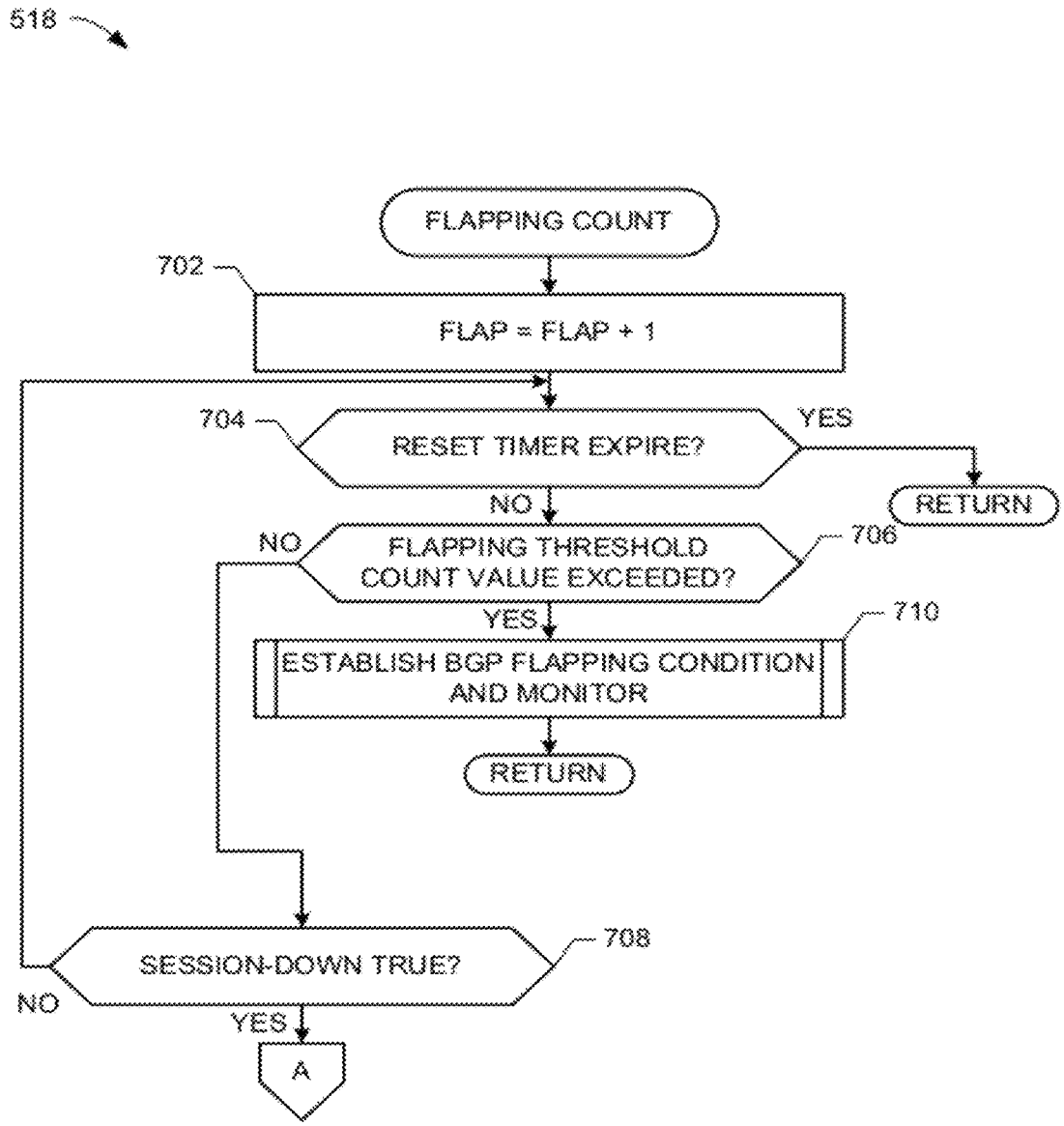

In the illustrated example of FIG. 7, trap manager 304 increments a flap count value (block 702) and the interface profile manager 310 determines whether the reset timer has expired (block 704). If the reset timer has not expired (block 704), then the example interface profile manager 310 determines whether a flapping threshold count value has been exceeded (block 706). If the flapping threshold has not been exceeded (block 706) (for example, a flapping count of 3 within the reset timer duration of ten-minutes), then the example BGP manager 120 continues to monitor for a session-down (block 708). If no session-down condition is true (block 708), then control returns to block 704 to determine whether the reset timer has expired. On the other hand, if a session-down is true (block 708), then control returns to block 510 of FIG. 5 to determine if a corresponding session-up condition is true. As such, the example BGP manager is able to count the number of flapping occurrences and verify if and when such flapping occurrences occur within one or more thresholds of time and frequency.

In the event that the reset timer has not expired (block 704), but the flapping count is exceeded (block 706), then the example BGP manager 120 concludes that a BGP Flapping condition is true (block 710) (that is, a threshold count of individual flapping occurrences within a threshold time period). However, while the BGP Flapping condition may warrant further network administrator attention and/or a trouble-ticket, other circumstances may exist that indicate the BGP Flapping condition does not cause substantial concern to the network administrator. For example, the BGP Flapping condition may have occurred merely because of inclement weather that caused power cycling in one or more network substations, in which supply power to the interfaces was interrupted. In such circumstances, the BGP Flapping condition may abate after the inclement weather passes.

On the other hand, if the BGP Flapping condition persists for multiple cycles and/or a sustained duration, then such a situation may be indicative of interface failures that require network administrator resources and/or issuing one or more trouble-tickets. To determine whether repeated BGP Flapping conditions occur for an extended period of time, also referred to as Continuous Flapping (block 710), control advances to the example machine-accessible instructions shown in FIG. 8.

Figure 8:
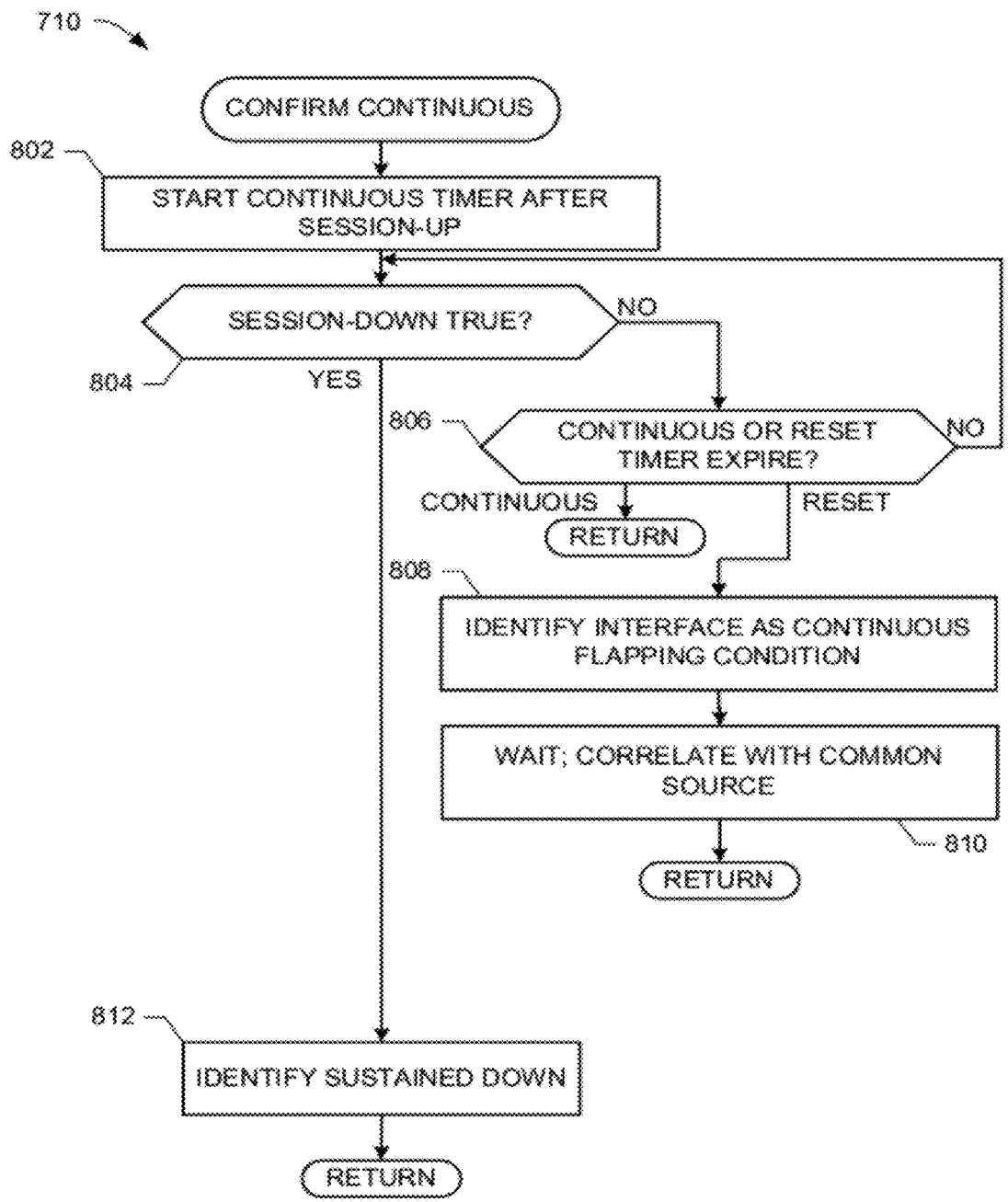

In the illustrated example of FIG. 8, the interface profile manager 310 initiates a continuous timer in response to the last session-up occurrence (block 802). As long as another session-down condition is not true (block 804), the example interface profile manager 310 determines whether either the continuous timer or the reset timer has expired (block 806). If neither timer expires, control advances to block 804 to continue to monitor for a session-down condition. In other words, even though the flapping threshold has been violated, the BGP session may still recover. The continuous timer is typically of a duration less than that of the example reset timer. For example, while the reset timer may be set at two-hours, the continuous timer may be set to an example duration of fifteen minutes. In the event that the continuous timer expires (block 806) without any session-down condition(s), then the interface/session is deemed to have recovered (a BGP session recovery state), and control returns to block 502 of FIG. 5

On the other hand, if the reset timer expires (block 806), then the example BGP manager 120 associates the suspected interface with the continuous flapping condition (block 808). Additionally, the BGP manager 120 may wait for a predetermined time period and then initiate a session correlation to identify a common source related to the BGP session failure (block 810). For example, if the instant BGP session failure was associated with an interface, such as a router, located in St. Louis in which the session was connected to a corresponding interface in Chicago, then the BGP manager 120 attempts to correlate the instant failure with another interface. Continuing with the above example, if an interface in Milwaukee also experiences a BGP session failure at or near the same time as the St. Louis interface BGP session failure, then an interface common to both (such as the Chicago interface) the St. Louis and Milwaukee interfaces may be identified as a suspect interface that is responsible for the failures.

Returning to block 804, if a session-down condition is true, then the example BGP manager 120 associates the suspected interface with a Sustained Down condition (block 812) and the BGP manager returns to block 502 of FIG. 5.

Figure 9:
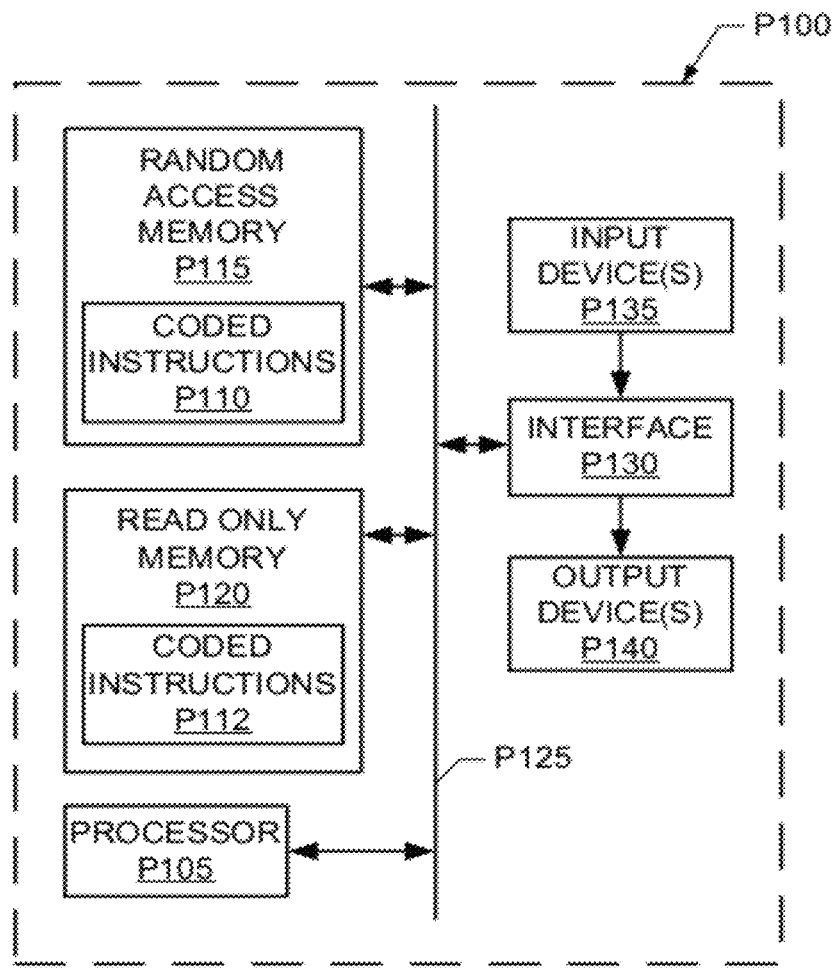
FIG. 9 is a schematic illustration of an example processor platform that may be used and/or programmed to carry out the example machine-accessible instructions of FIGS. 5-8, and/or to implement any or all of the example methods and apparatus described herein.

FIG. 9 is a schematic diagram of an example processor platform P100 that may be used and/or programmed to implement any or all of the example BGP manager 120, the example interface manager 302, the example trap manager 304, the example syslog manager 306, the example interface event comparator 308, and/or the example interface profile manager 310 of FIG. 3. For example, the processor platform P100 can be implemented by one or more general-purpose processors, processor cores, microcontrollers, etc.

The processor platform P100 of the example of FIG. 9 includes at least one general-purpose programmable processor P105. The processor P105 executes coded instructions P110 and/or P112 present in main memory of the processor P105 (for example, within a RAM P115 and/or a ROM P120). The processor P105 may be any type of processing unit, such as a processor core, a processor and/or a microcontroller. The processor P105 may execute, among other things, the example machine-accessible instructions of FIGS. 5, 6, 7, and/or 8 to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The example memory P115 may be used to implement the example databases 175 and/or 180 of FIG. 1.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to monitor border gateway protocol sessions, comprising:
   detecting a failure of a first border gateway protocol session;
   initiating a sustained-down timer in response to detecting the failure;
   matching a session time-stamp associated with the failure of the first border gateway protocol session with a second time-stamp associated with a failure of a second border gateway protocol session;
   identifying a sustained-down condition in response to the sustained-down timer exceeding a first time threshold; and
   identifying a root cause interface responsible for the sustained-down condition when (a) the session time-stamp associated with the failure matches the second time-stamp associated with log information indicative of the failure associated with the second border gateway protocol session and (b) an Internet protocol address of the first border gateway protocol session matches an Internet protocol address of the second border gateway protocol session.

2. A method as defined in claim 1, further comprising:
   identifying a flapping condition in response to counting a threshold number of border gateway protocol failures and corresponding border gateway protocol re-establishments during a second time threshold associated with a reset timer, the reset timer initiated in response to detecting the failure;
   initiating a continuous-flapping timer when the first border gateway protocol session is re-established after the flapping condition is identified; and
   identifying a border gateway protocol session recovery state when a continuous-flapping timer expires before the reset timer expires.

3. A method as defined in claim 1, further comprising:
   identifying a flapping condition in response to counting a threshold number of border gateway protocol failures and corresponding border gateway protocol re-establishments during a second time threshold associated with a reset timer, the reset timer initiated in response to detecting the failure;
   initiating a continuous-flapping timer when the first border gateway protocol session is re-established after the flapping condition is identified; and
   identifying a continuous flapping state when the reset-timer expires before the continuous-flapping timer expires.

4. A method as defined in claim 3, further comprising correlating the failure of the first border gateway protocol session with at least one other border gateway protocol session failure having at least one common interface with the first border gateway protocol session.

5. A method as defined in claim 1, further comprising identifying a causal relationship between a failed second border gateway protocol session and the failure of the first border gateway protocol session.

6. A tangible machine readable storage device comprising instructions that, when executed, cause a machine to perform operations comprising:
   initiating a sustained-down timer in response to detecting a failure of a first border gateway protocol session;
   matching a session time-stamp associated with the failure of the first border gateway protocol session with a second time-stamp associated with a failure of a second border gateway protocol session;
   identifying a sustained-down condition in response to the sustained-down timer exceeding a first time threshold; and
   identifying a root cause interface responsible for the sustained-down condition when (a) the session time-stamp associated with the failure of the first border gateway protocol session matches the second time-stamp associated with log information indicative of the failure associated with the second border gateway protocol session and (b) an Internet protocol address of the first border gateway protocol session matches an Internet protocol address of the second border gateway protocol session.

7. A machine readable storage device as defined in claim 6, wherein the instructions, when executed, cause the machine to:
   identify a flapping condition in response to counting a threshold number of border gateway protocol failures and corresponding border gateway protocol re-establishments during a second time threshold associated with a reset timer, the reset timer initiated in response to detecting the failure;
   initiate a continuous-flapping timer when the first border gateway protocol session is re-established after the flapping condition is identified; and
   identify a border gateway protocol session recovery state when a continuous-flapping timer expires before the reset timer expires.

8. A machine readable storage device as defined in claim 6, wherein the instructions, when executed, cause the machine to:
- identify a flapping condition in response to counting a threshold number of border gateway protocol failures and corresponding border gateway protocol re-establishments during a second time threshold associated with a reset timer, the reset timer initiated in response to detecting the failure;
- initiate a continuous-flapping timer when the first border gateway protocol session is re-established after the flapping condition is identified; and
- identify a continuous flapping state when the reset-timer expires before the continuous-flapping timer expires.

9. A machine readable storage device as defined in claim 8, wherein the instructions, when executed, cause the machine to correlate the failure of the first border gateway protocol session with at least one other border gateway protocol session failure having at least one common interface with the first border gateway protocol session.

10. A machine readable storage device as defined in claim 6, wherein the instructions, when executed, cause the machine to identify a causal relationship between a failed second border gateway protocol session and the failure of the first border gateway protocol session.

11. An apparatus comprising:
- a memory having machine readable instructions stored thereon; and
- a processor to execute the instructions to:
  - initiate a sustained-down timer in response to detection of a failure of a first border gateway protocol session;
  - match a session time-stamp associated with the failure of the first border gateway protocol session with a second time-stamp associated with a failure of a second border gateway protocol session;
  - identify a sustained-down condition in response to the sustained-down timer exceeding a first time threshold; and
  - identify a root cause interface responsible for the sustained-down condition when (a) the session time-stamp associated with the failure matches the second time-stamp associated with log information indicative of the failure associated with the second border gateway protocol session and (b) an Internet protocol address of the first border gateway protocol session matches an Internet protocol address of the second border gateway protocol session.

12. An apparatus as defined in claim 11, wherein the processor is to execute the instructions to:
- identify a flapping condition in response to counting a threshold number of border gateway protocol failures and corresponding border gateway protocol re-establishments during a second time threshold associated with a reset timer, the reset timer initiated in response to detecting the failure;
- initiate a continuous-flapping timer when the first border gateway protocol session is re-established after the flapping condition is identified; and
- identify a border gateway protocol session recovery state when a continuous-flapping timer expires before the reset timer expires.

13. An apparatus as defined in claim 11, wherein the processor is to execute the instructions to:
- identify a flapping condition in response to counting a threshold number of border gateway protocol failures and corresponding border gateway protocol re-establishments during a second time threshold associated with a reset timer, the reset timer initiated in response to detecting the failure;
- initiate a continuous-flapping timer when the first border gateway protocol session is re-established after the flapping condition is identified; and
- identify a continuous flapping state when the reset-timer expires before the continuous-flapping timer expires.

14. An apparatus as defined in claim 13, wherein the processor is to execute the instructions to correlate the failure of the first border gateway protocol session with at least one other border gateway protocol session failure having at least one common interface with the first border gateway protocol session.

15. An apparatus as defined in claim 11, wherein the processor is to execute the instructions to identify a causal relationship between a failed second border gateway protocol session and the failure of the first border gateway protocol session.

16. A method as defined in claim 1, wherein the log information indicative of the failure of the root cause interface comprises power loss information.

17. An apparatus as defined in claim 11, wherein the processor is to identify power loss information in the log information.

* * * * *